(12) United States Patent
Fujinawa et al.

(10) Patent No.: US 8,908,077 B2
(45) Date of Patent: Dec. 9, 2014

(54) PROJECTION DEVICE WITH DISPLAY MONITOR

(75) Inventors: Nobuhiro Fujinawa, Yokohama (JP); Hirotake Nozaki, Port Washington, NY (US); Akira Ohmura, Tokyo (JP)

(73) Assignee: Nikon Corporation, Tokyo (JP)

( * ) Notice: Subject to any disclaimer, the term of this patent is extended or adjusted under 35 U.S.C. 154(b) by 403 days.

(21) Appl. No.: 11/988,175

(22) PCT Filed: Jun. 29, 2006

(86) PCT No.: PCT/JP2006/312998
§ 371 (c)(1),
(2), (4) Date: Feb. 19, 2008

(87) PCT Pub. No.: WO2007/007559
PCT Pub. Date: Jan. 18, 2007

(65) Prior Publication Data
US 2009/0033785 A1 Feb. 5, 2009

(30) Foreign Application Priority Data

Jul. 12, 2005 (JP) .................. 2005-202821

(51) Int. Cl.
*H04N 5/222* (2006.01)
*G06F 3/14* (2006.01)
*H04N 9/31* (2006.01)
*H04N 5/225* (2006.01)
*G03B 21/00* (2006.01)
*H04N 5/232* (2006.01)
*H04N 101/00* (2006.01)
*H04N 1/00* (2006.01)

(52) U.S. Cl.
CPC .......... *G06F 3/1423* (2013.01); *H04N 2101/00* (2013.01); *H04N 9/3141* (2013.01); *H04N 5/225* (2013.01); *H04N 9/3179* (2013.01); *H04N 9/3176* (2013.01); *G03B 21/00* (2013.01); *H04N 5/23293* (2013.01); *H04N 9/3197* (2013.01); *H04N 1/00283* (2013.01); *H04N 2201/0084* (2013.01)
USPC .................. 348/333.01; 348/333.1; 348/744

(58) Field of Classification Search
CPC ... H04N 5/23293; H04N 9/3176; G03B 21/00
USPC ........................................ 348/333.01, 333.1
See application file for complete search history.

(56) References Cited

U.S. PATENT DOCUMENTS 6,195,068 B1 * 2/2001 Suzuki et al. .................. 345/2.2
6,930,669 B2 * 8/2005 Weiner et al. ................. 345/156

(Continued)

FOREIGN PATENT DOCUMENTS

EP      1 452 943 A2   9/2004
JP      A 09-251534    9/1997

(Continued)

OTHER PUBLICATIONS

Extended European Search Report issued in European Patent Application No. 06767615.5 on Dec. 30, 2009.

(Continued)

*Primary Examiner* — Usman Khan
(74) *Attorney, Agent, or Firm* — Miles & Stockbridge P.C.

(57) ABSTRACT

A projection device with a display monitor includes: a projection section that projects an optical image for display; a display monitor that displays a reproduced image; and a display controlling unit that individually controls both the projection section and the display monitor in response to an instruction to perform both a display by the display monitor and a projection display by the projection section so as to differentiate a display mode of the projection display and a display mode of the display.

20 Claims, 10 Drawing Sheets

(56) References Cited

U.S. PATENT DOCUMENTS

| | | | |
|---|---|---|---|
| 2002/0154224 A1* | 10/2002 | Yoneda | 348/211.4 |
| 2003/0058252 A1* | 3/2003 | Matsuda et al. | 345/589 |
| 2004/0105024 A1* | 6/2004 | Takahashi | 348/333.01 |
| 2004/0119852 A1* | 6/2004 | Shin | 348/240.2 |
| 2004/0164977 A1 | 8/2004 | Yoshida et al. | |
| 2005/0024678 A1* | 2/2005 | Kawai | 358/1.15 |
| 2005/0052626 A1* | 3/2005 | Zoidis et al. | 353/100 |
| 2005/0068501 A1* | 3/2005 | Nonaka et al. | 353/30 |
| 2005/0117050 A1* | 6/2005 | Jiang | 348/372 |

FOREIGN PATENT DOCUMENTS

| | | |
|---|---|---|
| JP | A 10-62865 | 3/1998 |
| JP | A 2000-236375 | 8/2000 |
| JP | 2001-215944 | 8/2001 |
| JP | 2004-193933 A | 7/2004 |
| JP | 2004-208231 | 7/2004 |
| JP | 2004-233904 | 8/2004 |
| JP | A 2004-258242 | 9/2004 |
| WO | WO 02/01545 A1 | 1/2002 |

OTHER PUBLICATIONS

Office Action issued Jul. 17, 2012 in Japanese Patent Application No. 2006-179200.

Office Action issued Feb. 14, 2012, in Japanese Patent Application No. 2006-179200.

Feierman, A., "Panasonic PT-LB30NTU—Review," Projector Reviews, May 27, 2005 [online] [retrieved on Jul. 11, 2014]. Retrieved from the Internet <URL: http://www.projectorreviews.com/panasonic/lb30ntu-image-quality/#daylight-view>.

Summons to Attend Oral Proceedings Pursuant to Rule 115(1) EPC, issued Jul. 4, 2014, in European Patent Application No. 06767615.5.

* cited by examiner

PROJECTION DEVICE WITH DISPLAY MONITOR

TECHNICAL FIELD

The present invention relates to an electronic apparatus including a projector that projects information and a display that displays information.

BACKGROUND ART

An electronic apparatus including a small device such as a mobile phone with a projection function is known (see Patent Document 1). The mobile phone disclosed in Patent Document 1 allows a calling party to have information project on a palm of his or her own or on a wall while he or she is calling.

Patent Document 1: Japanese Laid-Open Patent Application No. 2000-236375

DISCLOSURE OF THE INVENTION

Problems to be Solved by the Invention

The mobile phone with a projector also includes a liquid crystal display. Patent Document 1 discloses nothing about displaying (or projecting) information on a projector and a liquid crystal display for different use.

Means for Solving the Problems

According to a 1st aspect of the present invention, a projection device with a display monitor includes: a projection unit that projects an optical image for display; a display monitor that displays a reproduced image; and a display controlling unit that individually controls both the projection unit and the display monitor in response to an instruction to perform both a display by the display monitor and a projection display by the projection unit so as to differentiate a display mode of the projection display and a display mode of the display.

According to a 2nd aspect of the present invention, in the projection device with a display monitor according to the 1st aspect, it is also possible that the display controlling unit differentiates the display modes by causing the display monitor to decrease display luminance.

According to a 3rd aspect of the present invention, in the projection device with a display monitor according to the 1st aspect, it is also possible that the display controlling unit differentiates the display modes by controlling the projection unit to add emphasis to the projection display.

According to a 4th aspect of the present invention, in the projection device with a display monitor according to the 3rd aspect, the display controlling unit may intensify the emphasis as surroundings become brighter to differentiate the display modes.

According to a 5th aspect of the present invention, in the projection device with a display monitor according to the 1st aspect, it is also possible that the display controlling unit controls the display monitor and the projection unit to display different contents from each other to differentiate the display modes.

According to a 6th aspect of the present invention, in the projection device with a display monitor according to the 5th aspect, the display controlling unit may control the display monitor to display a thumbnail image and controls the projection unit to project a main image.

According to a 7th aspect of the present invention, in the projection device with a display monitor according to the 5th aspect, the display controlling unit may control the display monitor to display a menu and controls the projection unit to project a main image.

According to a 8th aspect of the present invention, in the projection device with a display monitor according to the 5th aspect, the display controlling unit may control the display monitor and the projection unit so as to display and project, respectively, images of different ranges from each other.

According to a 9th aspect of the present invention, in the projection device with a display monitor according to the 8th aspect, the display controlling unit may control the projection unit to project an image including a face of a subject displayed on the display monitor.

According to a 10th aspect of the present invention, in the projection device with a display monitor according to the 5th aspect, the display controlling unit may add additional information other than the thumbnail image in the display content of the display monitor.

According to a 11th aspect of the present invention, in the projection device with a display monitor according to the 5th aspect, the display controlling unit may add information indicating a projection range in the projection content of the projection unit.

According to a 12th aspect of the present invention, in the projection device with a display monitor according to any one of the 6th to 11th aspect, the display controlling unit may add an image for adjusting projection in a projection content of the projection unit.

According to a 13th aspect of the present invention, in the projection device with a display monitor according to the 5th aspect, the display controlling unit may control the display monitor to display a menu and controls the projection unit to project an image for adjusting projection.

According to a 14th aspect of the present invention, in the projection device with a display monitor according to any one of the 1st to 13th aspect, the display controlling unit may temporarily decrease projection luminance when the projection content to be projected by the projection unit changes.

According to a 15th aspect of the present invention, the projection device with a display monitor according to any one of the 1st to 14th aspect may further include an illumination unit that illuminates an operation member when the projection unit performs the projection display.

The projection unit may be replaced with a projection means.

The display controlling unit may be replaced with a display controlling means.

The illumination means may be replaced with an illumination means.

Advantageous Effect of the Invention

According to the present invention, when a monitor display and a projection display are performed simultaneously, different use can be made with each of the display modes.

BEST MODE FOR CARRYING OUT THE INVENTION

Hereinafter, the best mode for carrying out the present invention will be explained with reference to the attached drawings.

First Embodiment

Figure 1:
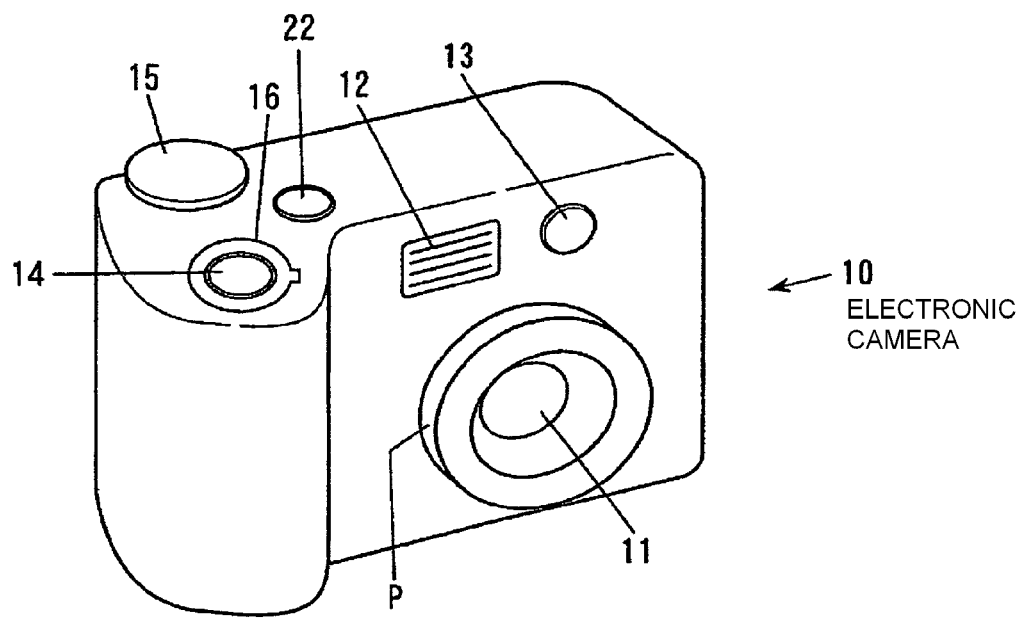
FIG. 1 is a front perspective view showing a projector-attached electronic camera according to a first embodiment of the present invention.

FIG. 1 is a front perspective view showing an electronic camera equipped with a projector or a projector-attached electronic camera according to a first embodiment of the present invention. In FIG. 1, a projector-attached electronic camera 10 is provided on the front thereof with a photographic lens 11, an illumination light window 12, and a projector projection window 13. The projector-attached electronic camera 10 is provided on the top thereof with a release button 14, a zoom switch 16, a mode switch-over dial 15, and a main switch 22.

Figure 2:
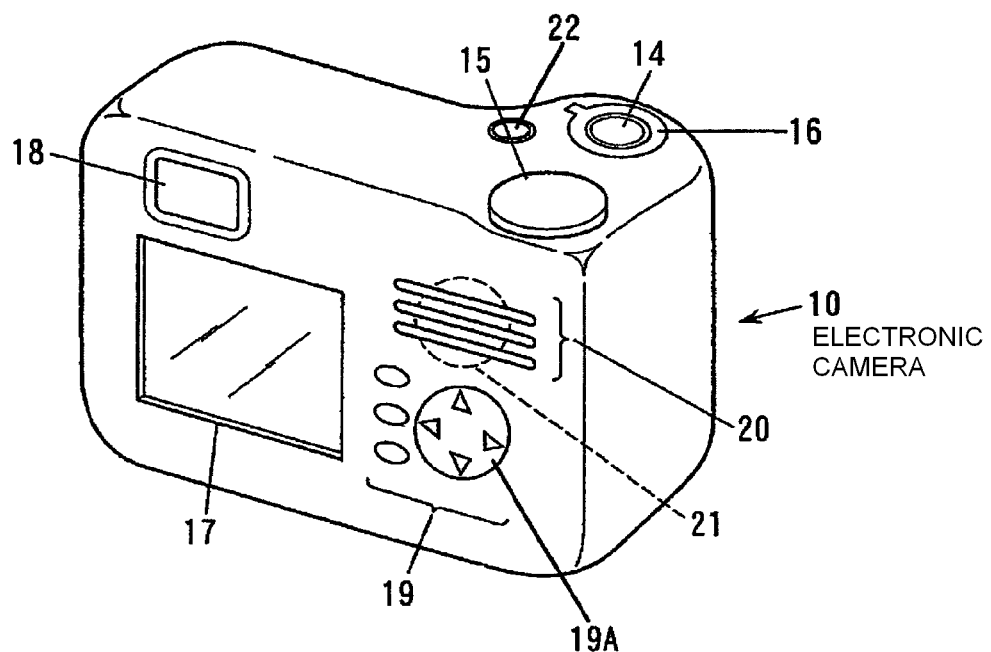
FIG. 2 is a rear perspective view of the projector-attached electronic camera shown in FIG. 1.

FIG. 2 is a rear perspective view of the projector-attached electronic camera shown in FIG. 1. In FIG. 2, the projector-attached electronic camera 10 is provided on the back thereof with a liquid crystal display 17, an electronic view finder 18, an operation member 19, and a speaker hole 20.

The projector-attached electronic camera 10 has mounted thereon a projector device (projector section) detailed below, which projects information such as an image through the projector projection window 13 toward, for example, a screen arranged on the front side of the projector-attached electronic camera 10 put on a desk. The projector-attached electronic camera 10 has incorporated therein a speaker 21 on the back side of the speaker hole 20 and reproduces information such as voice toward the rear of the projector-attached electronic camera 10.

The mode switch-over dial 15 is a mode switch-over operation member for switching over operation mode, such as a photographing mode or a projection mode, of the projector-attached electronic camera 10. The photographing mode is an operation mode in which an image of an object to be photographed is captured and an image data of the captured image is stored as a photographed image file in a recording medium constituted by, for example, a memory card. In the case of still image photography, a still image file is created whereas in the case of moving image shooting, a moving image file is created. In the photographing operation mode, the projector-attached electronic camera 10 is used mainly in a hand held state. The instruction to start photographing corresponds to an operation signal output in response to press-down of the release button 14. The projector-attached electronic camera 10 has mounted thereon the illumination device described below and light emitted from a luminous body such as a xenon tube is irradiated toward the front of the projector-attached electronic camera 10. The projector-attached electronic camera 10 is configured such that in the photographing mode, the data of voice collected by a microphone incorporated together with the speaker 21 on the rear side of the speaker hole 20 can be stored in the recording medium.

The projection mode is an operation mode in which data of a photographed image is, for example, read out from a recording medium (for example, the memory card 200 detailed below or an internal memory not shown) and a reproduced image from the image data is projected by the projector section through the projector projection window 13. The above-mentioned reproduction of the voice from the speaker 21 is operated in the projection mode. Note that in the projection mode, the projector-attached electronic camera 10 is configured to also enable projection of a reproduced image from the image data read out from another source than the recording medium or image data supplied from outside the projector-attached electronic camera 10.

The projector-attached electronic camera 10 includes a retracting mechanism for retracing a lens barrel P so that light projected from the projector projection window 13 should not be eclipsed by the lens barrel P of the photographing lens 11.

Figure 3:
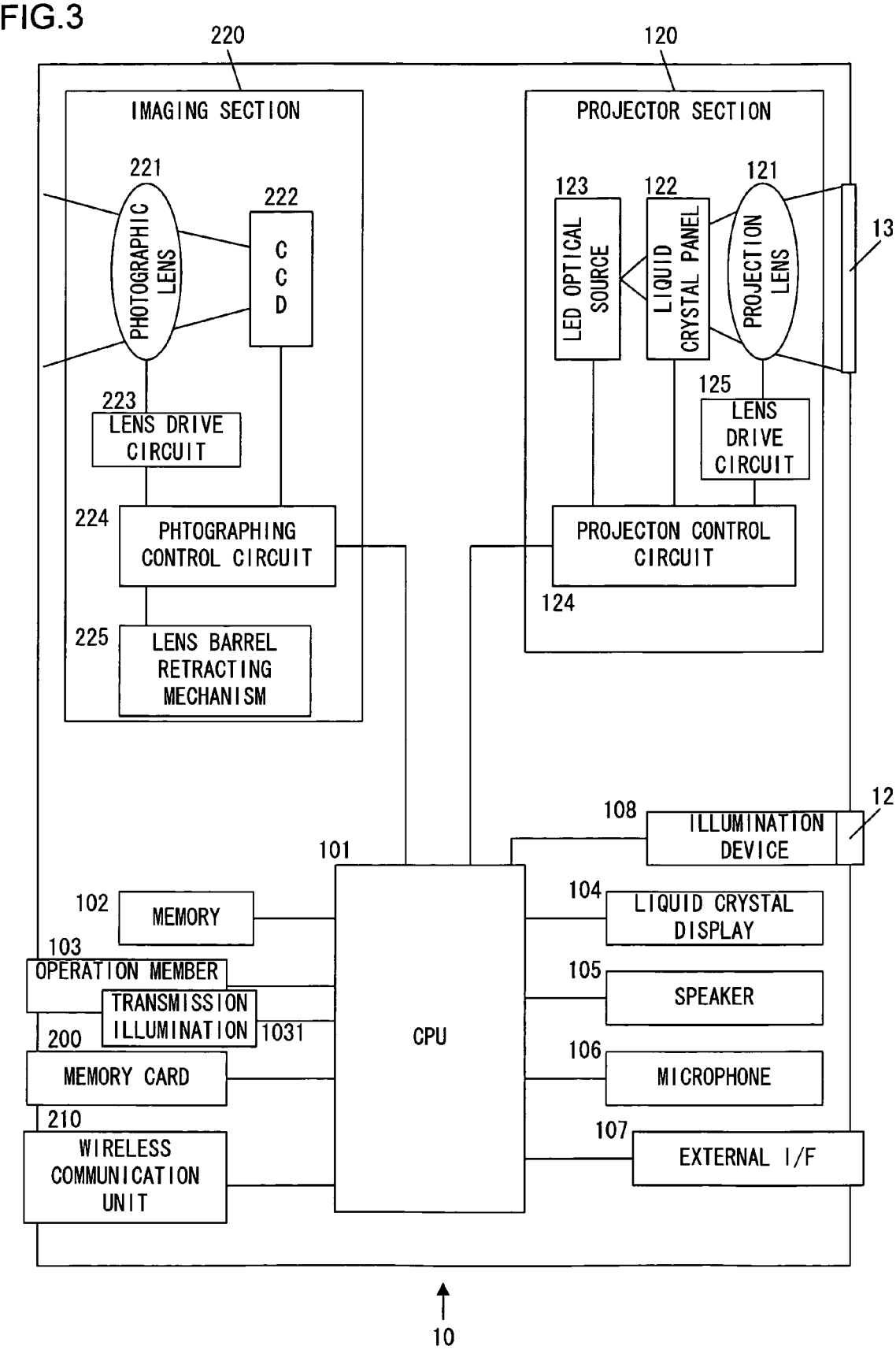
FIG. 3 is a block diagram illustrating the construction of a projector-attached electronic camera.

FIG. 3 is a block diagram illustrating the construction of the projector-attached electronic camera 10 explained above. In FIG. 3, the projector-attached electronic camera 10 includes a projector section 120, an imaging section 220, a CPU 101, a memory 102, an operation member 103, a liquid crystal display 104, a speaker 105, a microphone 106, an external interface (I/F) 107, and an illumination device 108. In a card slot (not shown) are implemented a memory card 200 and a wireless communication unit 210. Both the cards (units) are detachable.

The CPU 101 performs, for example, predetermined calculations using signals input from each section that constitutes the projector-attached electronic camera 10 based on a control program and sends control signals to each section of the projector-attached electronic camera 10 to control the photographing operation and projection operation. Note that the control program is stored in a nonvolatile memory (not shown) in the CPU 101.

The memory 102 is used as a work memory. The operation member 103 corresponds to the main switch 22, release button 14, zoom switch 16, and mode switch-over dial 15 shown in FIG. 1 as well as the operation member 19 in FIG. 12 and includes a halfway press-down switch or a full press-down switch (not shown) that turns ON in conjunction with the press-down operation of the release button 14. The halfway press-down switch turns ON as the press-down amount of the release button 14 reaches a halfway press-down operation amount whereas the full press-down switch turns ON as the press-down operation amount of the release button 14 reaches a full press-down operation amount that is larger than the halfway press-down operation amount. The operation member 103 sends an operation signal corresponding to the content of operation is sent to the CPU 101.

A transmission illumination device 1031 has, for example, a light emitting diode (LED) as the luminous body and ON/OFF of the illumination device is controlled according to an instruction from the CPU 101. In the operation member 103, a portion or the whole of a keycap of at least an operation member that is operated in the projection mode (in this embodiment, the mode switch-over dial 15, the release button 14, the zoom switch 16, and a cross-shape switch 19A) is constituted by a light transmitting member. As a result, when the transmission illumination device 1031 is turned on, the operation member is illuminated therethrough.

The memory card 200 is constituted by a nonvolatile memory such as a flash memory and is capable of writing, storing and reading out data such as image data acquired by the imaging section 220 according to an instruction from the CPU 101. The wireless communication unit 210 receives data transmitted from an external device (not shown) and demodulates the data and sends the demodulated image data and voice data to the CPU 101.

The illumination device 108 causes the luminous body to emit light according to an instruction to emit light from the CPU 101 and emits illumination light that illuminates an object to be photographed through the illumination light window 12 toward the front of the projector-attached electronic camera 10.

The liquid crystal display 104 (17 in FIG. 2) displays information such as an image or a text according to an instruction from the CPU 101. The text information includes operation conditions and operation menu of the projector-attached electronic camera 10. The speaker 105 (21 in FIG. 2) reproduces voice based on the voice data output from the CPU 101.

The microphone 106 converts collected voice to electric signals and sends them to the CPU 101. The voice signal data is recorded in the memory card 200 in the photographing mode.

The external interface (I/F) 107 converts video signals into image data and sends the converted image data to the CPU 101 in order to cause the liquid crystal display 104 to display or the projector section 120 to project a reproduced image according to the video signals transmitted from an external device such as a video camera. The external interface (I/F) 107 converts voice signals transmitted from an external device into voice data for reproducing voice through the speaker 15 and sends the converted voice data to the CPU 101.

(Imaging Section)

The imaging section 220 includes a photographic lens 221 (11 in FIG. 1), an image sensor 222, a lens drive circuit 223, a photographing control circuit 224, and a lens barrel retracting mechanism 225. Examples of the image sensor 222 that may be used include, for example, CCD and CMOS imaging elements. The photographing control circuit 224 controls drive of the image sensor 222 and the lens drive circuit 223 according to an instruction from the CPU 101 and performs predetermined image processing on imaging signals (stored charge signals) output from the image sensor 222. The image processing is, for example, white balance processing or gamma processing.

The photographic lens 221 forms an image of an object to be photographed on an imaging plane of the image sensor 222. The photographing control circuit 224 causes the image sensor 222 to start capturing an image according to an imaging start instruction, reads out stored charge signals from the image sensor 222 after termination of the image-capturing, performs the above-mentioned image processing, and sends the resultant to the CPU 101 as image data.

The lens drive circuit 223 drives a focus lens (not shown) that constitutes the photographic lens 221 back and forth in the direction of the optical axis based on a focus adjustment signal output from the photographing control circuit 224. In addition, the lens drive circuit 223 drives a zoom lens (not shown) that constitutes the photographic lens 221 in the direction of the optical axis (to the telephoto side or to the wide-angle side) back and forth. The amounts of focus adjustment and of zoom adjustment are instructed from the CPU 101 to the photographing control circuit 224.

(Focus Adjustment of Camera)

The imaging section 220 performs adjustment of the focus of the photographic lens 221 by shifting the focus lens that constitutes the photographic lens 221 in the direction of the optical axis. The CPU 101, when automatic focus adjustment is performed, sends a focus adjustment signal to the photographing control circuit 224 so that an integrated value (so-called focus evaluation value) of a high frequency component of the image signals is made maximum for those image signals corresponding to a focus detection area (for example, center of imaging plane) among the image signals obtained by the image sensor 222. The position of the focus lens that makes the focus evaluation value maximum is a focus position at which the edge blur of an image of an object captured by the image sensor 222 is eliminated and the contrast of the image is maximized.

(Zoom Adjustment of Camera)

The imaging section 220 performs optical zoom adjustment of the photographic lens 221 by shifting the zoom lens that constitutes the photographic lens 221 in the direction of the optical axis. The CPU 101 sends a zoom adjustment signal to the photographing control circuit 224 in response to an operation signal from the zoom switch 16. The CPU 101 sends a zoom adjustment signal so as to zoom up when a clockwise rotation operation signal is input from the zoom switch 16, and sends a zoom adjustment signal so as to zoom down when an anticlockwise rotation operation signal is input from the zoom switch 16. The zoom switch 16 is configured so as to selectively output one of two different operation signals.

Further, the photographing control circuit 224 sends an instruction to the lens barrel retracting mechanism 225 in response to the instruction from the CPU 101 to cause the lens barrel P (FIG. 1) to be retracted into a camera body of the projector-attached electronic camera 10 or to cause the retracted lens barrel P to be pulled out to a state for photographing (FIG. 1).

(Projector Section)

The projector section 120 includes a projection lens 121, a liquid crystal panel 122, an LED optical source 123, a projection control circuit 124, and a lens drive circuit 125. The projection control circuit 124 supplies drive current to the LED optical source 123 in response to a projection instruction output from the CPU 101. The LED optical source 123 illuminates the liquid crystal panel 122 at brightness corresponding to the supplied current.

The projection control circuit 124 further creates a liquid crystal panel drive signal according to the image data sent from the CPU 101 and drives the liquid crystal panel 122 with the created drive signal. In concrete terms, voltage corresponding to the image signal is applied to a liquid crystal layer pixel by pixel. The liquid crystal layer to which voltage is applied changes in the alignment of liquid crystal molecules so that the light transmittance of the liquid crystal layer changes. As mentioned above, by modulating the light from the LED optical source 123 according to the image signal, the liquid crystal panel 122 creates an optical image.

The projection lens 121 projects the optical image produced through the liquid crystal panel 122 to, for example, a screen. The lens drive circuit 125 drives back and forth the projection lens 121 in a direction perpendicular to the optical axis of the projection lens 121 based on an offset adjustment signal output from the projection control circuit 124. Further, the lens drive circuit 125 drives back and forth a focus lens (not shown) that constitutes the projection lens 121 in the direction of the optical axis based on the focus adjustment signal output from the projection control circuit 124. The lens drive circuit 125 further drives back and forth a zoom lens (not shown) that constitutes the projection lens 121 in the direction of the optical axis depending on the zoom adjustment signal. An offset adjustment amount, a focus adjustment amount, and a zoom adjustment amount are instructed to the projection control circuit 124 from the CPU 101.

(Offset of Projected Image)

By shifting the projection lens 121 in the direction perpendicular to the optical axis, the direction of irradiation of light flux emitted from the projector section 120 is changed to offset a projection image. Instead of shifting the projection lens 121, the offset of the projection image may be performed by shifting the liquid crystal panel 122 and/or the LED optical source 123 in the direction perpendicular to the optical axis. That is, the offset of the projection image can be realized by changing relative position of the projection lens 121 and the liquid crystal panel 122 in the direction perpendicular to the optical axis.

(Keystone Correction of Projection Image)

When a part of the projection lens 121, the liquid crystal panel 122, and the LED optical source 123 is shifted in the direction orthogonal to the optical axis, Keystone correction is performed to the data to be projected according to the shift amount. In case only the above-mentioned offset is given to projection image, the projection image is deformed to have a trapezoidal shape, and thus the CPU 101 electrically performs Keystone correction to the projection image by image processing in order to correct the trapezoidal shape into a rectangular shape. The memory in the CPU 101 stores in advance initial correction values for correcting the projection image into a rectangular geometry. The CPU 101 reads out an initial correction value corresponding to the offset adjustment amount and based on the read out initial value, performs Keystone correction on the data of the image to be projected on the memory 102 so as to send the image data after the Keystone correction processing to the projection control circuit 124.

(Focus Adjustment of Projection Image)

The projector section 120 performs focus adjustment of the projection image by shifting the focus lens constituting the projection lens 121 in the direction of the optical axis. When manual focus adjustment is performed, the CPU 101 sends a focus adjustment signal to the projection control circuit 124 according to the operation signal from the operation member 103.

(Zoom Adjustment of Projection Image)

The projector section 120 performs zoom adjustment of the projection image by shifting the focus lens constituting the projection lens 121 in the direction of the optical axis. The CPU 101 sends a zoom adjustment signal to the projection control circuit 124 according to the operation signal from the operation member 103.

(Projection Source: Source)

The projector section 120 projects or reproduces contents of any one of the following source 1 to source 4 according to an instruction from the CPU 101. The CPU 101 sends image data corresponding to each image so that the projection image of source 1 to source 4 is cyclically switched over in the order of source 1, →2, →3, →4, →1, . . . each time a source changing operation signal is input from the operation member 103. Note, however, that when the memory card 200 is not attached to the projector-attached electronic camera 10, the source 1 is skipped. When the wireless communication unit 210 is not attached to the projector-attached electronic camera 10, the source 2 is skipped. Further, when no external device is connected to the external interface (I/F) 107, the source 4 is skipped.

Source 1. Reproduced image according to the data read out from the memory card 200;

Source 2. Reproduced image according to the data received by the wireless communication unit 210;

Source 3. Reproduced image according to the data stored in an internal memory (for example, nonvolatile memory in the CPU 101); and Source 4. Reproduced image according to the data input from the external interface (I/F) 107.

When images corresponding to the source 1 or the source 3 above are to be projected, the CPU 101 reads out image date with newest recording date (the data of image most recently photographed) from the memory card 200 (or internal memory) in order and sends the read out image data to the projector section 120.

The present invention is featured by the operation of the projector-attached electronic camera 10 when it is switched over to the projection mode and hence explanation is centered on the control performed by the CPU 101 when the projection mode is started up.

Figure 4:
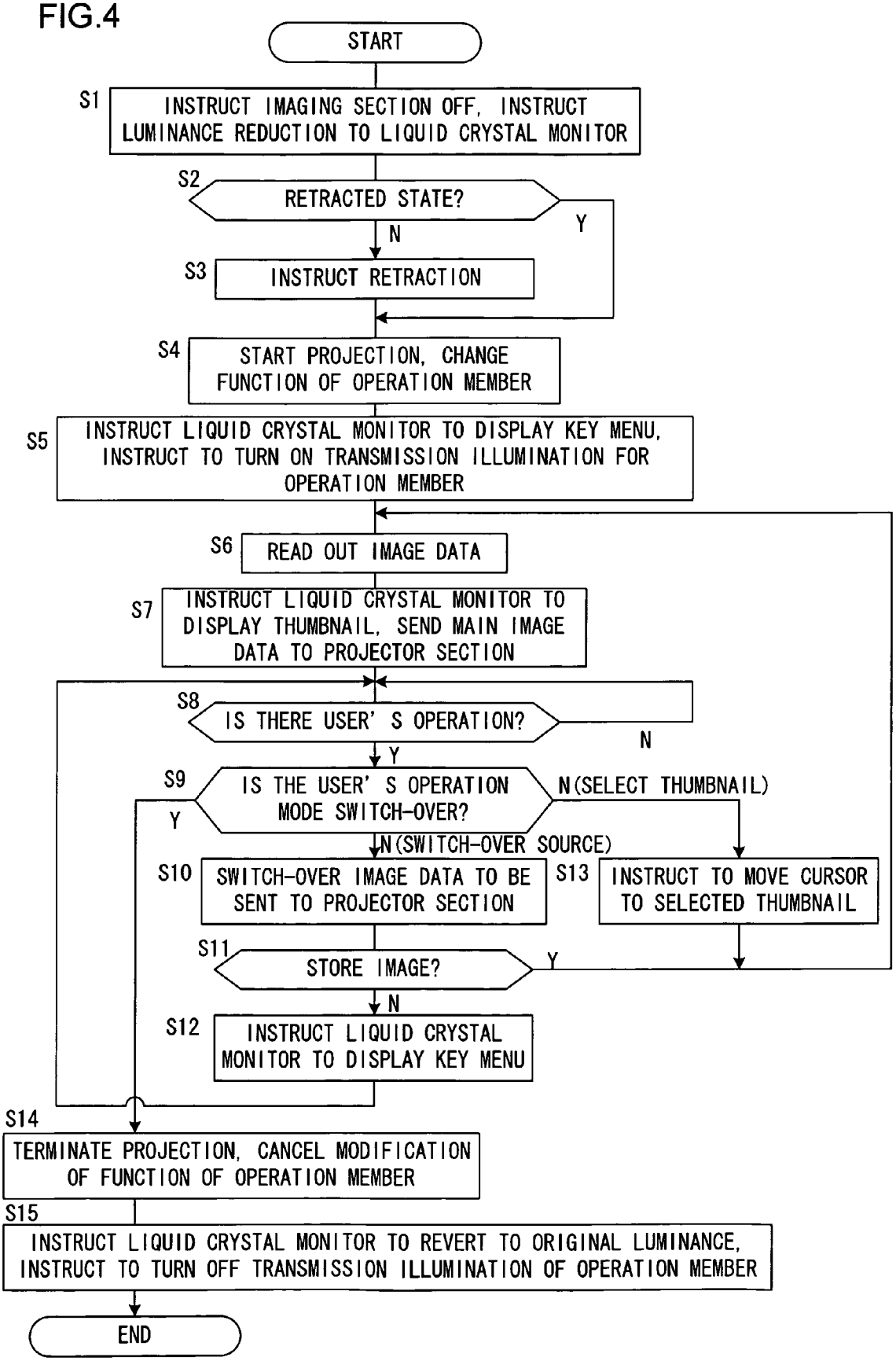
FIG. 4 is a flowchart illustrating the flow of procedure realized by a program executed by a CPU in a projection mode.

FIG. 4 is a flowchart illustrating the flow of procedure realized by a program executed by the CPU 101 of the projector-attached electronic camera 10 in the projection mode. The processing illustrated in FIG. 4 is started up when an operation signal that instructs switch-over to the projection mode is input to the CPU 101 from the mode switch-over dial 15. The switch-over signal to the projection mode corresponds to an instruction for simultaneously performing reproduction display by the liquid crystal display 104 (liquid crystal monitor) and projection display by the projector section 120.

In a step S1 in FIG. 4, the CPU 101 instructs the photographing control circuit 224 to turn off the imaging section and also instructs the liquid crystal display 104 (liquid crystal monitor) to decrease display luminance and the flow of control proceeds to a step S2. This results in termination of the imaging operation by the imaging section 220 and darkening of display screen of the liquid crystal display 104. The decrease of display luminance is performed by, for example, decreasing the lighting luminance of a backlight (not shown).

In the step S2, the CPU 101 judges whether or not the lens barrel P is in the retracted state. When the CPU 101 receives a signal indicating that the lens barrel P is in the retracted state from the photographing control circuit 224, an affirmative judgment is made in the step S2 and the flow of control proceeds to a step S4, whereas when the CPU 101 receives a signal indicating that the lens barrel P is in a non-retracted state, a negative judgment is made in the step S2 and the flow of control proceeds to a step S3.

In the step S3, the CPU 101 sends a command (instruction) for retracting to the photographing control circuit 224 and the flow of control proceeds to the step S4. In the step S4, the CPU 101 instructs the projection control circuit 124 to start projection and changes the function of the release button 14 and the zoom switch 16 arranged on the top of the projector-attached electronic camera 10 among operation members 103, and subsequently the flow of control proceeds to a step S5. By the instruction to start projection, the LED optical source 123 is lit in the projector section 120.

Subsequent to the step S4 above and until cancellation of the modified function in a step S14 described below, each of the release button 14 and the zoom switch 16 is handled as operation members having different functions from those in the photographing mode. In this case, the release button 14 is handled as an operation member for switching over the projection source but not as an operation member for instructing photographing. On the other hand, the zoom switch 16 is handled as an operation member for zoom adjustment of the projection lens 121 (projection image) but not for zoom adjustment of the photographic lens 221.

In the step S5, the CPU 101 instructs the liquid crystal display 104 (liquid crystal monitor) to display a key menu and also instructs the transmission illumination device 1031 to turn on transmission illumination (lighting), and the flow of control proceeds to a step S6. The display of the key menu is a display explaining the operation members whose functions have been modified as described above. For example, a figure representing the zoom switch 16 and the text "ZOOM ADJUSTMENT OF PROJECTION LENS" are displayed in relation to each other and a figure representing the release button 14 and the text "SWITCH-OVER PROJECTION SOURCE" are displayed in relation to each other.

In a step S6, the CPU 101 reads out image data of which the recording date is newest (a main image in the image signals) from the memory card 200 (or internal memory) (or reads out from the memory card 200 in the default setting) and reads out thumbnail image data (a thumbnail image in the image signals) of a predetermined number of files (for example, four files) in descending order of date. Then, the flow of control proceeds to a step S7. Both the main image and the thumbnail image are read out from the file from which the main image data are read out.

In the step S7, the CPU 101 sends data for displaying thumbnail images to the liquid crystal display 104 (liquid crystal monitor) and instruct the liquid crystal display 104 (liquid crystal monitor) to display the thumbnail images. At the same time, the CPU 101 sends data for projection display of the main image to the projector section 12 and instructs the projector section 12 to project the reproduced image. Then, the flow of control proceeds to a step S8. As a result, four frames of thumbnail images are displayed on the liquid crystal display 104 and the reproduced image according to the main image is projected by the projector section 120. Note that the CPU 101 sends data for projection display of which contrast, chroma saturation and contour have been each emphasized to the projector section 120 in order to make the projection image to be projected by the projector section 120 more vividly.

The CPU 101 further causes the liquid crystal display 104 to display a cursor on the thumbnail image that corresponds to the display image projected by the projector section 120 among the thumbnail images that are being displayed on the liquid crystal display 104 (liquid crystal monitor). When voice data are stored in relation to the data file of the image that is being projected, the CPU 101 causes the speaker 105 to reproduce a voice according to the voice data.

In the step S8, the CPU 101 judges whether or not an operation is performed by the user. If an operation signal is input from the operation member 103 (FIG. 3), an affirmative judgment is made in the step S8, and the flow of control proceeds to a step S9 while if no operation signal is input from the operation member 103, a negative judgment is made and the judgment processing is repeated.

In the step S9, the CPU 101 judges whether or not the operation by the user is a mode switch-over operation. If the input operation signal is an operation signal from the mode switch-over dial 15 for switching over the mode to the photographing mode, an affirmative judgment is made in the step S9 and the flow of control proceeds to a step S14. On the other hand, if the input operation signal is a halfway press-down signal generated by the press-down of the release button 14 (in this case, a source switch-over signal), a negative judgment is made in the step S9 and the flow of control proceeds to a step S10. Furthermore, if the thumbnails are being displayed on the liquid crystal display 104 (liquid crystal monitor) and the input operation signal is an operation signal from the cross-shape switch 19A (in this case, a thumbnail selection signal), a negative judgment is made in the step S9 and the flow of control proceeds to a step S13. When the flow of control proceeds to the step S10, it is deemed that the source switch-over has been instructed while when the flow of control proceeds to the step S13, it is deemed that the thumbnail has been selected.

In the step S10, the CPU 101 switches over the image data for projection to be sent to the projector section 120 in the order of the above-mentioned sources 1. →2. →3. →4. →1 by one each time when the halfway press-down signal is input.

In a step S11, the CPU 101 judges whether or not the image data to be sent to the projector section 120 are an image that corresponds to the above-mentioned source 1. or source 3. (that is, stored image). If the image data to be sent to the projector section 120 is a stored image, an affirmative judgment is made in the step S11 and the flow of control returns to the step S6 to read out the image data from the memory card 200 (or the internal memory). On the other hand, if the image data to be sent to the projection section 120 are an image that corresponds to the above-mentioned source 2. or source 4. (that is, non-stored image), a negative judgment is made in the step S11 and the flow of control proceeds to a step S12.

In the step S13 to which the flow of control proceeds when the thumbnail selection is made, the CPU 101 instructs the liquid crystal display 104 (liquid crystal monitor) to shift the cursor onto a thumbnail image indicated by the thumbnail selection signal and the flow of control returns to the step S6. For example, if an operation signal indicating rightward is input from the cross-shape switch 19A, the CPU 101 causes the liquid crystal display 104 (liquid crystal monitor) to shift the cursor from the thumbnail image on which the cursor presently is placed to a thumbnail image on the right hand side thereof.

When the flow of control returns to the step S6 via the step S13, the CPU 101 reads out a main image data corresponding to the thumbnail image on which the cursor has shifted from the memory card 200 (or the internal memory) (from the memory card 200 in the default setting) and also reads out thumbnail image data of a predetermined number of files (for example, four files) in descending order of date starting from the main image data file. Then, the flow of control proceeds to the step S7.

In the step S12 to which the flow of control proceeds when a negative judgment is made in the step S11, the CPU 101 instructs the liquid crystal display 104 (liquid crystal monitor) to display a key menu and the flow of control returns to the step S8. As described above, when no thumbnail image data are contained in the projection source, key menu display instead of thumbnail display is performed. The key menu display is the same as that in the step S5.

In the step S14 to which the flow of control proceeds when the mode switch-over is instructed, the CPU 101 instructs the projection control circuit 124 to terminate projection and cancels the modification of functions of the release button 14 and the zoom switch 16 and then, the flow of control proceeds to a step S15. As a result, the LED light source 123 is turned off in the projector section 120.

In the step S15, the CPU 101 sends an instruction to the liquid crystal display 104 (liquid crystal monitor) to stop (terminate) the key menu display (when the thumbnail images are displayed, the thumbnail display) and to set the display luminance of the liquid crystal display 104 decreased in the step S2 back to the original level. The CPU 101 further instructs the transmission illumination device 1031 to turn transmission illumination off (extinction) and the processing as illustrated in FIG. 4 is terminated.

Note that the above-mentioned steps S4 to S14 are adapted to always enable zoom adjustment of the projection lens 121. When an operation signal is input from the zoom switch 16, the CPU 101 performs the following interruption processing. When a clockwise rotation operation signal is input from the zoom switch 16, the CPU 101 sends a zoom adjustment signal to the projection control circuit 124 so as to zoom up the projection image while when a counterclockwise rotation operation signal is input from the zoom switch 16, the CPU 101 sends a zoom adjustment signal to the projection control circuit 124 so as to zoom down the projection image.

(Effector)

The projection control circuit 124 temporarily decreases the lighting illumination of the LED light source 123 when the still image projected by the projector section 120 is to be switched over to another image. For example, effect processing is performed by gradually decreasing the light emission amount from a state where the light emission amount of the LED light source 123 is in an ordinary level in one second, and then gradually increasing the decreased light emission amount in one second to cause the lighting luminance to return to the original level. Further, the projection control circuit 124 causes the liquid crystal panel 122 to create thereon a light image according to the image data freshly sent from the CPU 101 while the lighting luminance of the LED light source 123 is being decreased by the effect processing.

The above-mentioned effect processing is performed at the time of switch-over of the projection source and also is performed at the time of switch-over of the projection image by, for example, frame advance or frame reverse when the projection source is a stored image such as the above-mentioned source 1. or source 3. The switch-over of the projection image includes switch-over at the time of slide show in which the CPU 101 automatically instructs switch-over of projection images and switch-over of projection image performed in response to an operation signal from the operation member 103. Note that when a predetermined number of frames are to be advanced (or reverse) at a time, it is preferred to change an optical image currently formed on the liquid crystal panel 122 directly to an optical image of a frame to be reached after advancing the predetermined number of frames during a single round of effect processing (that is, no optical image of frames present in mid-course of frame advance is formed on the liquid crystal panel 122).

According to the first embodiment detailed hereinabove, the following operational effects can be obtained.

(1) Since the projector-attached electronic camera 10 is configured to automatically project reproduced images according to the main image data stored in the memory card 200 when the mode is switched over to the projection mode (steps S4 to S7), the operation of turning the projection lamp ON and the operation of selecting projection images after the switch-over to the projection mode are unnecessary. As a result, the projector-attached electronic camera 10 has improved usability in the projection mode.

(2) The projector-attached electronic camera 10 has been changed in function such that when the mode of the camera is changed to the projection mode, the release button 14 is handled as an operation member for switching over projection sources and the zoom switch 16 is handled as an operation member for zoom adjustment of a projection image (step S4). As a result, it is unnecessary to add a new operation member with respect to projection.

(3) Since explanation of the operation members whose functions have been changed in (2) above is displayed as a key menu on the liquid crystal display 104, the camera is user-friendly.

(4) Since the camera with a projector 10 is configured such that when the mode of the camera is switched over to the projection mode, the luminance of the liquid crystal display 104 is decreased (step S1), a display luminance appropriate for displaying in a dark room is obtained and at the same time power consumption can be economized. In addition, when the mode is to be returned to the photographing mode, the decreased display luminance is automatically returned to the original level (step S15), so that the camera is user-friendly.

(5) A part of or the whole of the keycap of each of the mode switch-over dial 15, the release button 14, the zoom switch 16, and the cross-shape switch 19A that are operated during the projection mode is constituted by a light transmitting member so that transmission illumination is performed in the projection mode (step S5). In this manner, the operation members are easy to view in a dark room during projection and in addition, the operation member that is required in the projection mode can be notified to the user.

(6) In the projector-attached electronic camera 10, contrast, chroma saturation and contour are emphasized in order to make images to be projected more vividly, high-quality projection images can be obtained even when a white screen is used which would otherwise compromise the contrast of the projection image thereon. The degree of emphasis processing may be changed, for example, according to brightness (luminance information) indicated by the output signal from a photometric sensor (not shown) or the image sensor 222. In this case, brighter luminance information results in more intense emphasis whereas darker luminance information results in weaker emphasis.

(7) The projector-attached electronic camera 10 displays four thumbnail images on the liquid crystal display 104 when the projection source contains thumbnail image data and projects from the projector section 120 a reproduced image according to the main image data corresponding to the thumbnail image on which the cursor is displayed among the thumbnail images being displayed (steps S6, S7, S9, and S13). This enables the user to select an image to be projected while he or she views a plurality of thumbnail images.

(8) The projector-attached electronic camera 10 is configured to cyclically switch over projection images corresponding to the above-mentioned sources 1. to 4. each time source switch-over is instructed in the projection mode (step S10). As a result, a reproduced image can be projected on the projector section 120 regardless of the data format and signal format of the image to be input to the projector-attached electronic camera 10 and in addition, selection of projection contents can be made by a simple operation.

(9) Since the projector-attached electronic camera 10 is configured such that when a still image projected by the projector section 120 is switched over to another image, the projection luminance (lighting luminance by the LED light source 123) is temporarily decreased to add a softening effect, the stimulation given to the sense of sight of the user can be reduced.

Variation Example 1

While in the above-mentioned explanation, four thumbnail images per screen are displayed on the liquid crystal display 104 (liquid crystal monitor), the number of thumbnail images is not limited to 4 but may be 2 or 9.

Variation Example 2

While in the step S1 above, the display luminance has been decreased by decreasing the lighting luminance of a backlight (not shown) of the liquid crystal display 104 in response to the switch-over to the projection mode, the display luminance may be decreased by turning off the backlight only and retaining the display by the liquid crystal display 104 as it is.

Variation Example 3

According to the above explanation, a plurality of thumbnail images is displayed on the liquid crystal display 104 (liquid crystal monitor) and a reproduced image corresponding to the thumbnail image on which the cursor is displayed among the plurality of thumbnail images is projected from the projector section 120. Instead of this, one thumbnail image may be displayed on the liquid crystal display 104 (liquid crystal monitor) and a reproduced image obtained by enlarging (or reducing) the thumbnail image may be projected from the projector section 120. As a result, images in different areas can be displayed (projected) on the liquid crystal display 104 (liquid crystal monitor) and the projector section 120.

Variation Example 4

The zoom switch 16 may be constituted by a seesaw switch that outputs two different operation signals selectively in place of the above-mentioned rotary operation switch. Further, the zoom switch may be constituted by two switches consisting of a "zoom up" switch and a "zoom down" switch which are provided independently of each other.

Variation Example 5

While explanation has been made on the projector-attached electronic camera 10 that includes a projector and an electronic camera united in advance, an electronic camera system may be constituted by an electronic camera and a projector detachably attached to the electronic camera. In the latter case, the electronic camera system is switched into a projection mode to start up a program similar to that illustrated in FIG. 4 when the projector is attached to an accessory shoe (not shown) of the electronic camera. Note that the CPU 101 in the electronic camera and the projection controlling circuit in the projector transmit/receive data therebetween through a signal terminal (not shown) attached to the accessory shoe. The operation signal from the operation member of the electronic camera is transmitted to the projector through the above-mentioned signal terminal.

Variation Example 6

While explanation has been made on the projector-attached electronic camera 10 as an example, the present invention is also applicable to any other electronic apparatuses such as a mobile phone with a projector and a projection device as far as it is an electronic apparatus provided with the projector 120 and the liquid crystal display 104.

Second Embodiment

Figure 5:
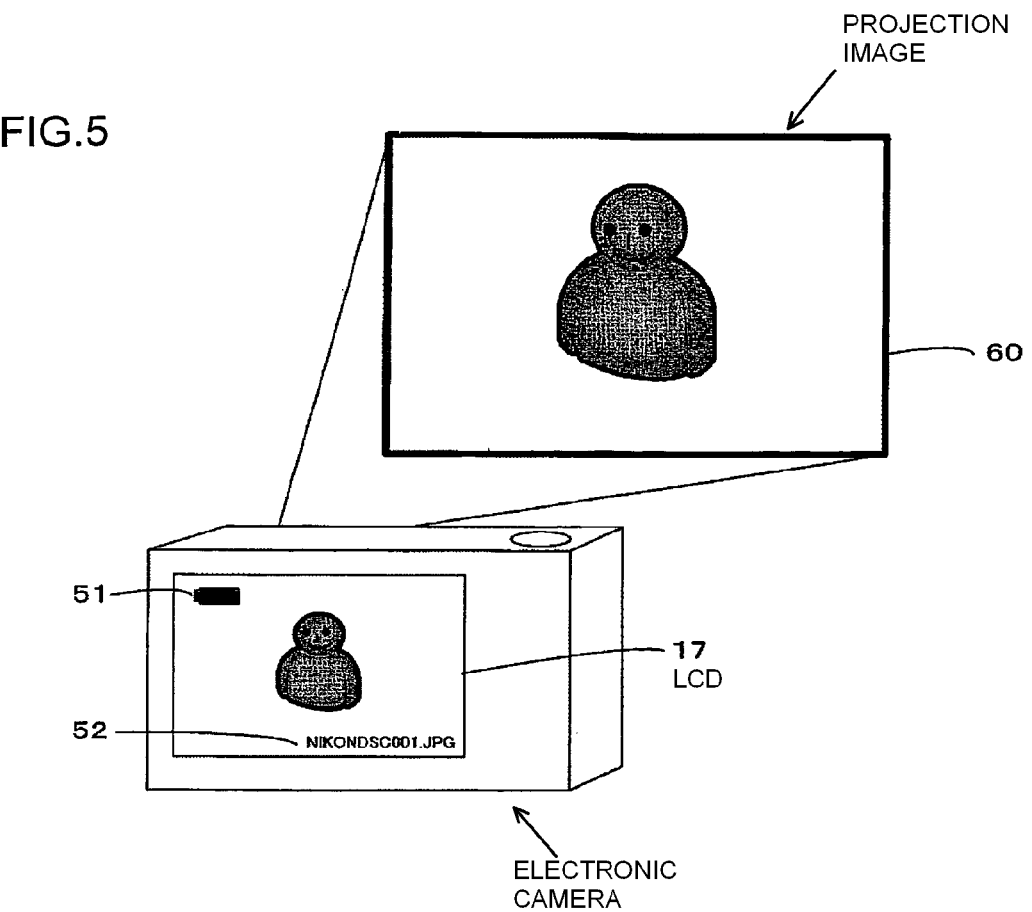
FIG. 5 is a diagram exemplifying the content displayed on a liquid crystal display and the content projected by a projector section in a third embodiment.

Explanation is made in more detail on an example in which the content displayed by the liquid crystal display (liquid crystal monitor) differs from the content projected by the projector section 120. FIG. 5 is a figure exemplifying a case in which the liquid crystal display 17 (reference numeral 104 in FIG. 3) displays a thumbnail image and the projector section 120 projects an original image corresponding to the thumbnail image.

As shown in FIG. 5, a thumbnail image according to data for displaying thumbnail out of the data in the image file is displayed on the liquid crystal display 17. On the liquid crystal display 17 is further displayed a name 52 of the image file containing a frame number as superimposed on the thumbnail image. At the same time, a battery mark 51 for indicating remaining battery power detected by a power supply circuit (not shown) is superimposed on the thumbnail image. The display control of the liquid crystal display 17 is performed by the CPU 101 of the projector-attached electronic camera 10.

On the other hand, the projector section 120 projects an image according to the data for the main image (original image) out of the data in the image file and also a frame 60 for indicating projection range around the original image. The projector section 120 does not project the name of the image. And, no battery mark is projected in a normal condition. The projection control is performed by the CPU 101 and the projection control circuit 124.

Figure 6:
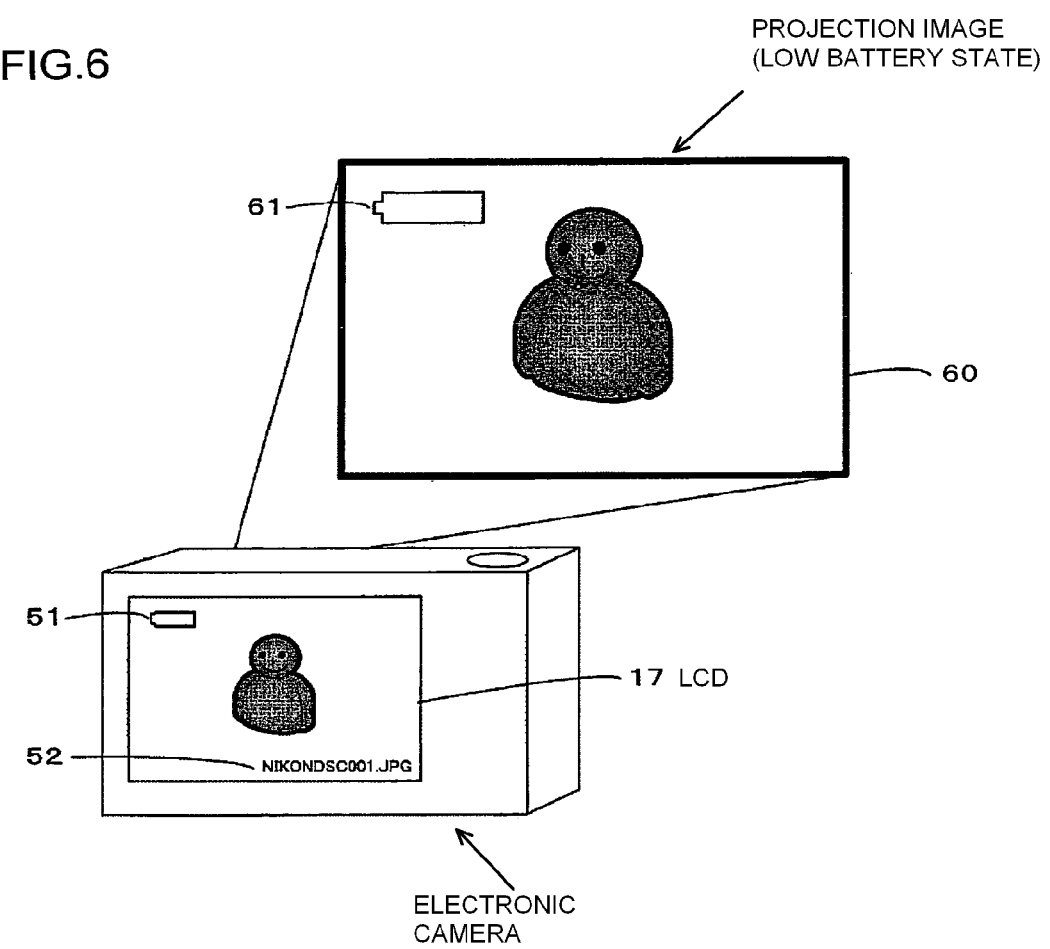
FIG. 6 is a diagram exemplifying the content to be displayed on a liquid crystal display when the remaining battery power decreased below a predetermined level.

FIG. 6 is a figure that exemplifies the content displayed by the liquid crystal display 17 (liquid crystal monitor) and the content projected by the projector section 120 when it is detected by the power supply source (not shown) that the remaining battery power is equal to or lower than a predetermined level. When the remaining battery power is equal to or lower than the predetermined level, the projector section 120 projects a battery mark 61 superimposed on the original image in the same manner as the battery mark 51 displayed on the liquid crystal display 17 (liquid crystal monitor).

As explained above, according to the second embodiment, the following operational effects can be achieved.

(1) Since the projector section 120 projects an image according to the data for the main image (original image) out of the data in the image file, a projected image having higher definition than the thumbnail image displayed by the liquid crystal display 17 (liquid crystal monitor) can be obtained by using the liquid crystal panel 122 having a larger number of pixels than the number of pixels constituting the thumbnail image data.

(2) Additional information such as the name 52 of the image file and the battery mark 51 in addition to the thumbnail image is displayed on the liquid crystal display 17 (liquid crystal monitor). On the other hand, the content of the projection by the projector section 120 includes no additional information but the original image. Accordingly, the name of image file and the battery mark would not be cumbersome to a viewer who looks at the projected image.

(3) Since the battery mark 61 is included in the content of projection by the projector section 120 when it is detected that the remaining battery power becomes equal to or lower than the predetermined level, the user can be notified of a decrease in the remaining battery power even when the user views only the projected image projected by the projector section 120 without looking at the display content of the liquid crystal display 17 (liquid crystal monitor).

(4) Since the frame 60 for indicating the projection range of the projector section 120 is projected, the projection range becomes more easily recognizable to the viewer who looks at the projected image and use of the frame is effective upon Keystone correction.

Variation Example 7

It may be configured such that when turning off of the display by the liquid crystal display 17 (liquid crystal monitor) is instructed, the projector section 120 projects additional information such as the name of the image file and the battery mark.

Third Embodiment

The content projected by the projector section 120 may contain a calibration pattern for adjusting projection. When adjusting focus of the projected image, the position of the focus lens (projection lens 121) is adjusted such that edges contained in the projection content have no blur and contrast of the projected image becomes maximal. In this case, it is difficult to adjust focus if the projected image contains no contrast information or if the projected image is a moving image and hence the contrast information varies. In the third embodiment, the projector section 120 performs projection in such a manner that a contrast calculation pattern 62 is included in a portion of the original image so that the focus adjustment can be done regardless of the original image to be projected.

Figure 7:
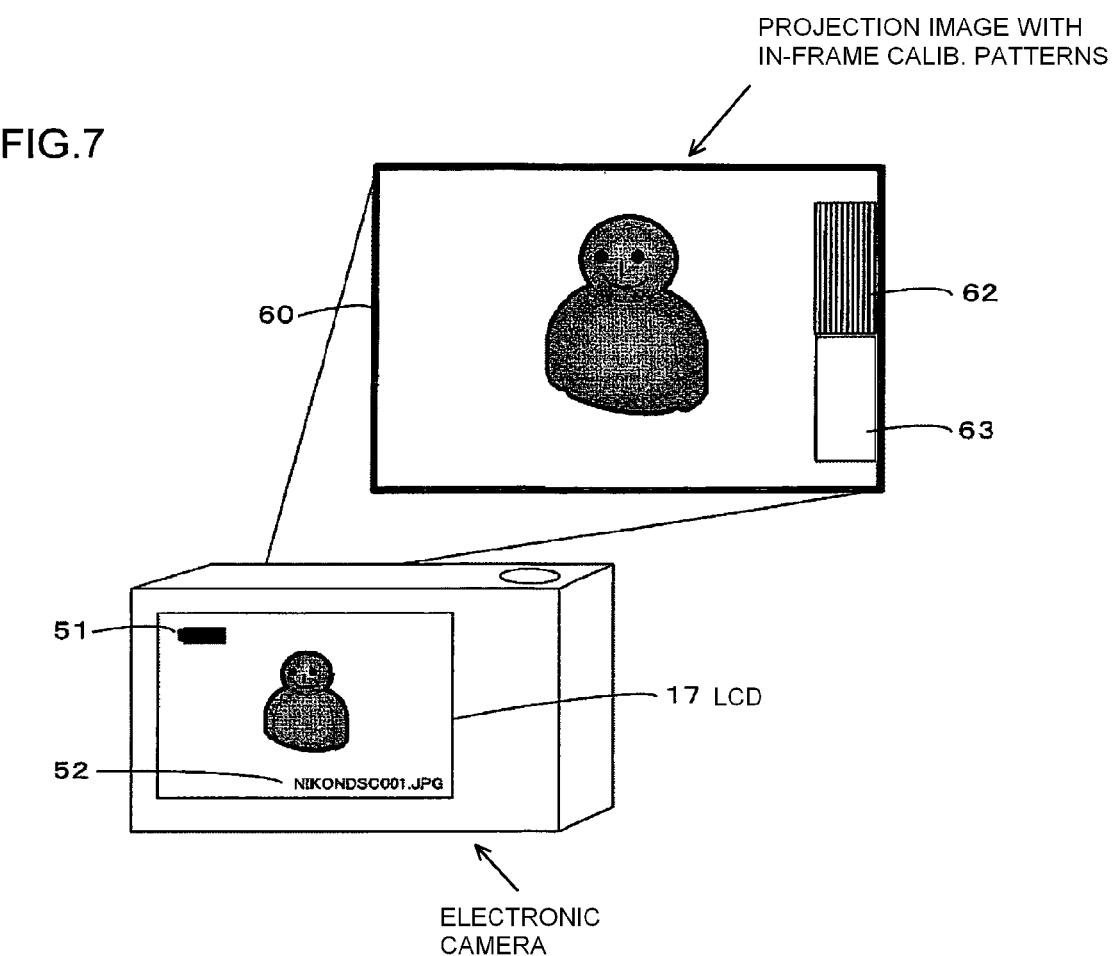
FIG. 7 is a diagram exemplifying the content displayed on a liquid crystal display and the content projected by a projector section in a third embodiment.
Figure 8:
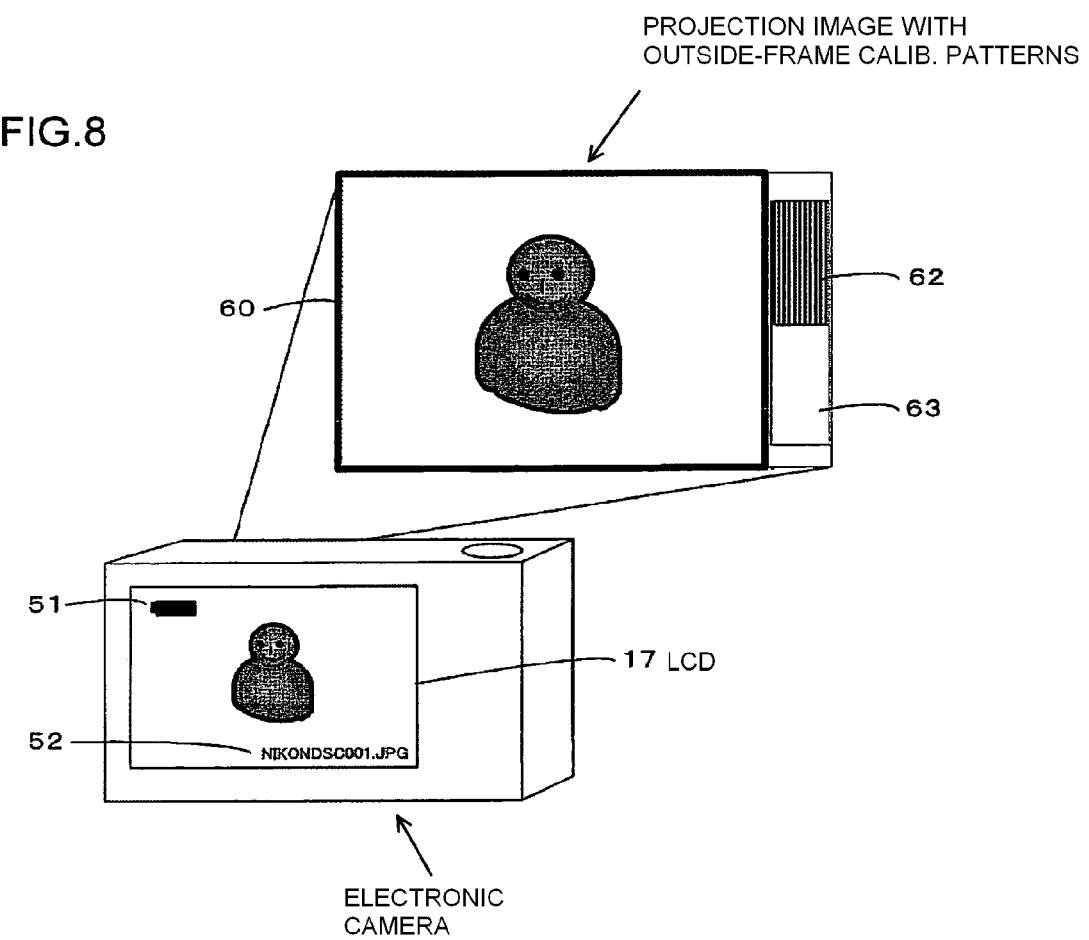
FIG. 8 is a diagram exemplifying the content displayed on a liquid crystal display and the content projected by a projector section in a variation example.

FIG. 7 is a figure exemplifying the content displayed on the liquid crystal display 17 (liquid crystal monitor) and the content projected by the projector section 120 in the third embodiment. The projector section 120 projects an original image after substituting the contrast calculation pattern 62 for a part of the original image. In this manner, it becomes easy to adjust the focus condition of the projected image even if the original image is constituted by intermediate gradation components and contains no contrast information or even if the original image varies.

The contrast calculation pattern 62 has a pattern of a predetermined form composed of, for example, a series of vertical lines so that a degree of contrast can be easily calculated. The contrast calculation pattern 62 may be always included in the projection content or it may be included temporarily only during the focus adjustment on the projected image.

In FIG. 7, the projector section 120 also makes a brightness detection pattern 63 to be included on the bottom of the contrast calculation pattern 62. If the projector section 120 fails to project an image at an appropriate brightness, the projected image is too dark or too bright for the viewer to view it. For controlling the brightness of projected image, the brightness of projected image is adjusted by varying the lighting luminance of the LED optical source 123 so as to achieve appropriate brightness in a high luminance portion contained in the projection content. In this case, the adjustment of brightness is difficult to be performed if the projected image containing no high luminance portion or if the projected image is a moving image and the position and luminance of the high luminance portion vary. Accordingly, to make it possible to perform adjustment of brightness without being affected by the original image to be projected, the projector section 120 causes the brightness detection pattern 63 to be included in a part of the original image.

The brightness detection pattern 63, for example, has a predetermined pattern in white so that the brightness of the projected image can be easily detected. The brightness detection pattern 63 may be included always in the projection content or temporarily only at the time of adjusting the brightness of the projected image.

According to the third embodiment detailed above, the following operational effects can be obtained.

(1) Since the content of projection by the projector section 120 includes the contrast calculation pattern 62 and the brightness detection pattern 63 for use in projection adjustment while the display content displayed by the liquid crystal display 17 (liquid crystal monitor) includes none of the contrast calculation pattern and the brightness detection pattern, each pattern does not disturb the user when he or she views the liquid crystal display 17 (liquid crystal monitor).

(2) Since the contrast calculation pattern 62 is constituted so as to have a pattern of a predetermined form composed of a series of vertical lines, the contrast calculation pattern is also effective when checking whether or not the projection image is inclined.

Variation Example 8

In FIG. 7, the calibration patterns 62 and 63 are each included inside the frame 60. However, it may also be configured such that the calibration patterns 62 and 63 are each projected outside the frame 60. By projecting both the calibration patterns 62 and 63 outside the frame 60, the calibration patterns 62 and 63 do not distract the viewer who views the projection image even when the calibration patterns 62 and 63 are always included in the projection content.

Variation Example 9

The contrast calculation pattern 62 and the brightness detection pattern 63 exemplified as images for use in projection adjustment may be of any patterns so far as they allow contrast calculation and brightness detection, respectively.

Fourth Embodiment

Figure 9:
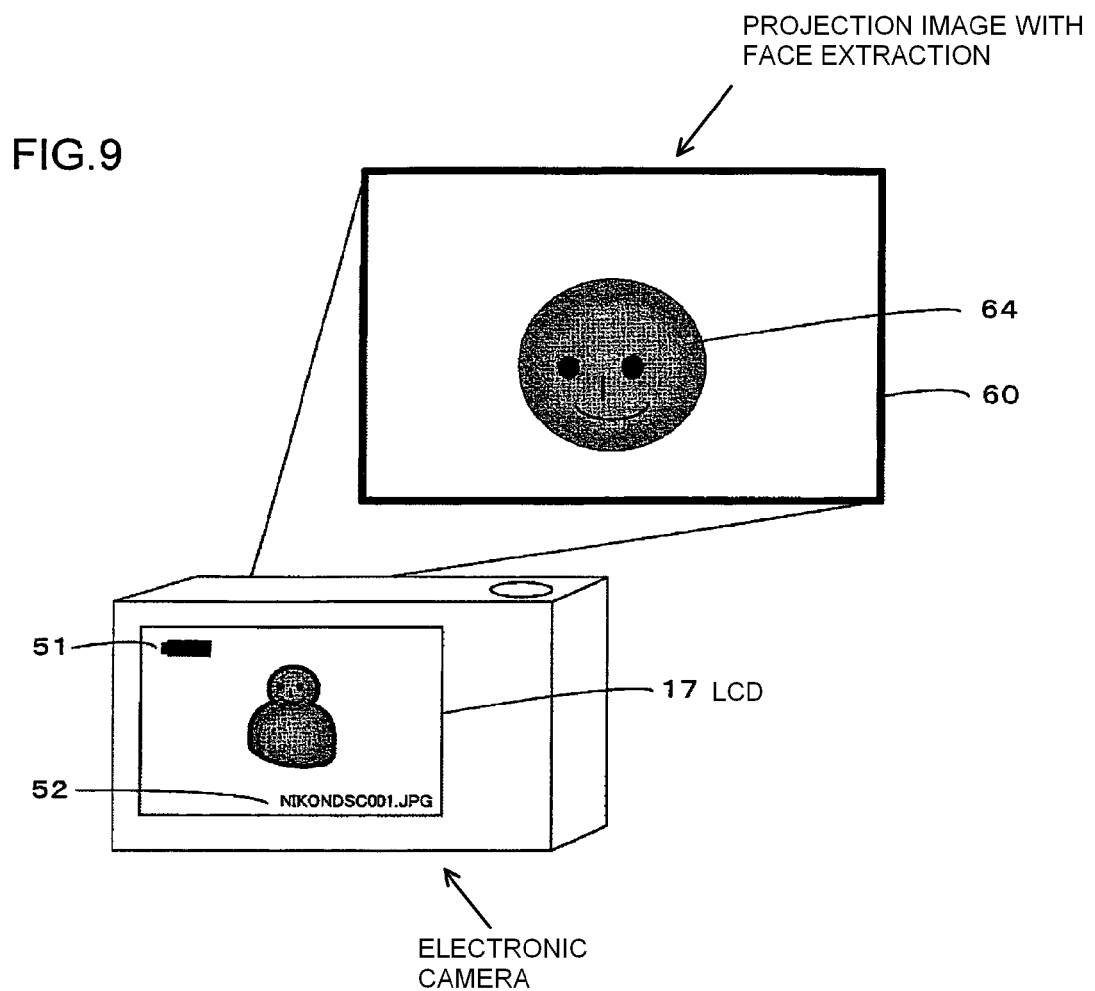
FIG. 9 is a diagram exemplifying the content displayed on a liquid crystal display and the content projected by a projector section in a fourth embodiment.

FIG. 9 is a figure exemplifying the case in which the liquid crystal display 17 (reference numeral 104 in FIG. 3) in the projector-attached electronic camera 10 displays one thumbnail image and an image containing a face area of a subject extracted from within the original image corresponding to the thumbnail image is projected as a closeup by the projector section 120.

In this case, the CPU 101 performs face extraction according to the data for main image (original image) out of the data in the image file. The face extraction uses, for example, the technology disclosed in Japanese Laid-Open Patent Publication No. 9-251534. The projector section 120 enlarges the data of the face area extracted by the CPU 101 to a size greater than a projection size in ordinary projection and projects an enlarged image. As shown in FIG. 9, within the image containing a person displayed in the liquid crystal display 17 (liquid crystal monitor), a face image 64 corresponding to the face of the person is projected by the projector section 120 and the frame 60 indicating a projection range is projected around the face image 64. In the same manner as in the second embodiment, the name of image file is not projected and no battery mark is projected in a normal condition.

According to the fourth embodiment detailed above, the projector-attached electronic camera 10 is adapted to perform face extraction for main image (original image) out of the data in the image file and cause the face image 64 containing the extracted face to undergo closeup projection by the projector section 120. This enables the viewer of the projected image to view a projected image projected at high definition in a larger size. On the other hand, a user who views the display content of the liquid crystal display 17 (liquid crystal monitor) can confirm the whole image by the thumbnail image. Note that the face extraction may be performed to extract the face of an animal as well as the face of a person.

Fifth Embodiment

Figure 10:
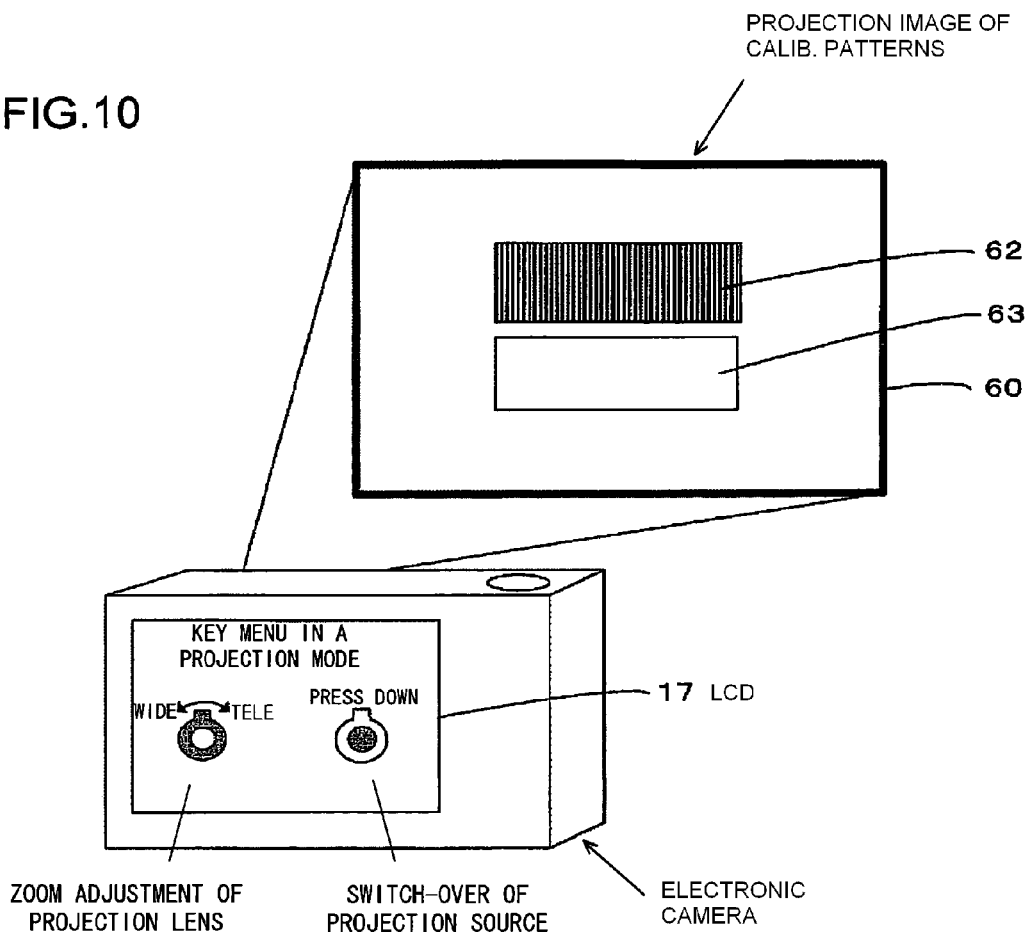
FIG. 10 is a diagram exemplifying the content displayed on a liquid crystal display and the content projected by a projector section in a fifth embodiment.

FIG. 10 is a figure exemplifying the case in which the liquid crystal display 17 (reference numeral 104 in FIG. 3) of the projector-attached electronic camera 10 displays a key menu while the projector section 120 projects the calibration patterns 62 and 63.

According to FIG. 10, the key menu in the projection mode is displayed on the liquid crystal display 17 (liquid crystal monitor). The fact that a diagram representing the zoom switch 16 and the text "ZOOM ADJUSTMENT OF PROJECTION LENS" are displayed in relation to each other and the fact that a diagram representing the release button 14 and the text "SWITCH-OVER OF PROJECTION SOURCE" are displayed in relation to each other correspond to the contents detained in the above-mentioned steps S5 and S6.

On the other hand, the projector section 120 projects the contrast calculation pattern 62 and the brightness detection pattern 63 as calibration patterns substantially in the center of the projection range and also projects the frame 60 indicating the projection range around the calibration patterns.

According to the fifth embodiment detailed above, since the calibration patterns for projection adjustment are projected substantially in the center of the projection range, it is easier to perform focus adjustment and brightness adjustment of projected image than in the case where the projection of the calibration patterns is performed on an edge of the projection range. By use of the key menu displayed on the liquid crystal display 17 (liquid crystal monitor), explanation on operation members whose functions have been changed can be provided to a user who views the display content of the liquid crystal display 17 (liquid crystal monitor)

Variation Example 10

The color adjustment coefficient of an image displayed on the liquid crystal display 17 (liquid crystal monitor) and the color adjustment coefficient of the image projected by the projector may differ from one another. If a screen or a wall on which the projector section 120 projects an image is not in white, the hue of the projected image may differ from the hue desired by the user. In this case, the projector section 120 changes the color adjustment coefficient of the projected image projected by the projector section 120 in response to a hue adjustment instruction.

The First to Fifth Embodiments and Variation Examples 1 to 10 may be combined appropriately to obtain other configurations.

While various embodiments and variation examples have been described in the above explanation, the present invention is not limited thereto. Other modes conceivable within the technical concept of the present invention are included in the scope of the present invention.

The disclosure of the following priority application is herein incorporated by reference:
Japanese Patent Application No. 2005-202821 (filed Jul. 12, 2005);

The invention claimed is:

1. A projection device with a display monitor, comprising:
a projection unit that projects an optical image for display;
a display monitor that displays a reproduced image; and
a display controlling device that, in response to an instruction to perform both a display by the display monitor and a projection display by the projection unit, controls the display monitor and the projection unit so as to differentiate a content of the display by the display monitor and a content of the projection display, wherein
the display controlling device controls the display monitor to display an image of a mark indicating a remaining battery power detected by a power supply circuit regardless of the remaining battery power; and
the display controlling device controls the projection unit to project the image of the mark indicating the remaining battery power only when the remaining battery power detected by the power supply circuit has become lower than a predetermined level.

2. A projection device with a display monitor according to claim 1, wherein:
the display controlling device controls the display monitor to decrease display luminance.

3. A projection device with a display monitor according to claim 1, wherein:
the display controlling device controls the projection unit to add emphasis to the projection display.

4. A projection device with a display monitor according to claim 3, wherein:
the display controlling device intensifies the emphasis as surroundings become brighter.

5. A projection device with a display monitor according to claim 1, wherein:
the display controlling device controls the display monitor to display a thumbnail image, and controls the projection unit to project a main image.

6. A projection device with a display monitor according to claim 1, wherein:
the display controlling device controls the display monitor to display a menu and controls the projection unit to project a main image.

7. A projection device with a display monitor according to claim 1, wherein:
the display controlling device controls the display monitor and the projection unit so as to display and project, respectively, images of different ranges from each other.

8. A projection device with a display monitor according to claim 7, wherein:
the display controlling device controls the projection unit to project an image including a face of a subject displayed on the display monitor.

9. A projection device with a display monitor according to claim 5, wherein:
the display controlling device adds additional information other than the thumbnail image in the display content of the display monitor.

10. A projection device with a display monitor according to claim 1, wherein:
the display controlling device adds information indicating a projection range in the projection content of the projection unit.

11. A projection device with a display monitor according to claim 5, wherein:
the display controlling device adds an image for adjusting projection in a projection content of the projection unit.

12. A projection device with a display monitor according to claim 1, wherein:
the display controlling device controls the display monitor to display a menu and controls the projection unit to project an image for adjusting projection.

13. A projection device with a display monitor according to claim 1, wherein:

the display controlling device temporarily decreases projection luminance when the projection content to be projected by the projection unit changes.

14. A projection device with a display monitor according to claim 1, further comprising:
an illumination device that illuminates an operation member when the projection unit performs the projection display.

15. A device comprising:
a display monitor;
a projection unit that project an optical image for display; and
a display controlling device that controls the display monitor and the projection unit,
wherein, in a projection mode, the display controlling device controls the display monitor and the projection unit such that:
when a remaining battery power detected by a power supply circuit is lower than a predetermined level, a display by the display monitor and the projected display by the projection unit both show an image of a mark indicative of the remaining battery power, and
when the remaining battery power detected by the power supply circuit exceeds the predetermined level, only the display by the display monitor shows the image of the mark indicative of the remaining battery power.

16. The device of claim 15, wherein the display controlling device controls the display monitor and the projection unit such that a content of the display by the display monitor and a content of the projected display are different.

17. The device of claim 15, further comprising a housing with a window, wherein the projection unit projects the optical image for display through said window and the display monitor is disposed on an opposite side of the housing from said window.

18. The device of claim 15, wherein the display controlling device controls the display monitor to have a first luminance level during a photographing mode and to decrease display luminance from the first luminance level during the projection mode.

19. The device of claim 15, wherein, in a projection mode, the display controlling device controls the display monitor to display a thumbnail image and the projection unit to project a main image.

20. The device of claim 19, wherein the display controlling device controls the display monitor to display additional information with the thumbnail image, which additional information is not shown with the main image in the projected display.

* * * * *